(12) United States Patent
Glinert

(10) Patent No.: US 7,815,051 B2
(45) Date of Patent: *Oct. 19, 2010

(54) CONTAINER SYSTEM

(76) Inventor: Robert Glinert, P.O. Box 620376, Middleton, WI (US) 53562

( * ) Notice: Subject to any disclaimer, the term of this patent is extended or adjusted under 35 U.S.C. 154(b) by 0 days.

This patent is subject to a terminal disclaimer.

(21) Appl. No.: 12/330,198

(22) Filed: Dec. 8, 2008

(65) Prior Publication Data

US 2009/0084689 A1 Apr. 2, 2009

Related U.S. Application Data

(63) Continuation of application No. 11/502,652, filed on Aug. 11, 2006, now Pat. No. 7,470,023, which is a continuation-in-part of application No. 11/297,896, filed on Dec. 8, 2005, now Pat. No. 7,338,158.

(51) Int. Cl.
    *B65D 85/00* (2006.01)
(52) U.S. Cl. .................. 206/701; 206/703; 206/726; 361/679.41
(58) Field of Classification Search ............. 351/41, 351/63, 158; 206/5, 525, 514, 526, 701, 206/703, 716, 725, 726; 211/85.1, 26, 26.2; 248/902; 361/679.02, 679.41
    See application file for complete search history.

(56) References Cited

U.S. PATENT DOCUMENTS

| | | |
|---|---|---|
| 1,158,169 A | 10/1915 | Bradley et al. |
| 1,240,536 A | 9/1917 | Bradley et al. |
| 1,427,947 A | 9/1922 | Flitton |
| 1,715,348 A | 6/1929 | Barbara |
| 4,401,209 A | 8/1983 | Salmond et al. |
| 4,953,695 A | 9/1990 | Tallman |
| 5,014,846 A | 5/1991 | Walker et al. |
| 5,151,778 A | 9/1992 | Conley |
| D332,525 S | 1/1993 | Ogata |
| 5,240,105 A | 8/1993 | Tsai |
| 5,331,721 A | 7/1994 | Raum, Sr. |
| 5,366,072 A | 11/1994 | Goldenberg |
| 5,526,924 A | 6/1996 | Klutznick |
| 6,088,884 A | 7/2000 | Hentz |
| 6,591,461 B2 * | 7/2003 | Salentine et al. ........... 24/115 F |
| 7,338,158 B2 | 3/2008 | Glinert |
| 7,470,023 B2 * | 12/2008 | Glinert ....................... 351/158 |
| 2003/0205596 A1 | 11/2003 | Ling |
| 2004/0045840 A1 | 3/2004 | Gagnon |
| 2004/0057199 A1 * | 3/2004 | Azuchi ....................... 361/683 |
| 2004/0118706 A1 | 6/2004 | Hasenfrantz |
| 2005/0186995 A1 | 8/2005 | Gill |
| 2007/0051842 A1 * | 3/2007 | Pryor ....................... 242/378.3 |
| 2007/0132939 A1 | 6/2007 | Glinert |

FOREIGN PATENT DOCUMENTS

WO    WO 2005/106568    11/2005

* cited by examiner

*Primary Examiner*—Huy K Mai
(74) *Attorney, Agent, or Firm*—Bell & Manning, LLC

(57) ABSTRACT

A system comprising a container, a linking segment, and a container stand is provided. The container is configured to hold an object and includes an attachment device. The linking segment is configured for attachment to both the object and to the container. The container stand is configured to detachably receive the container using the attachment device.

12 Claims, 5 Drawing Sheets

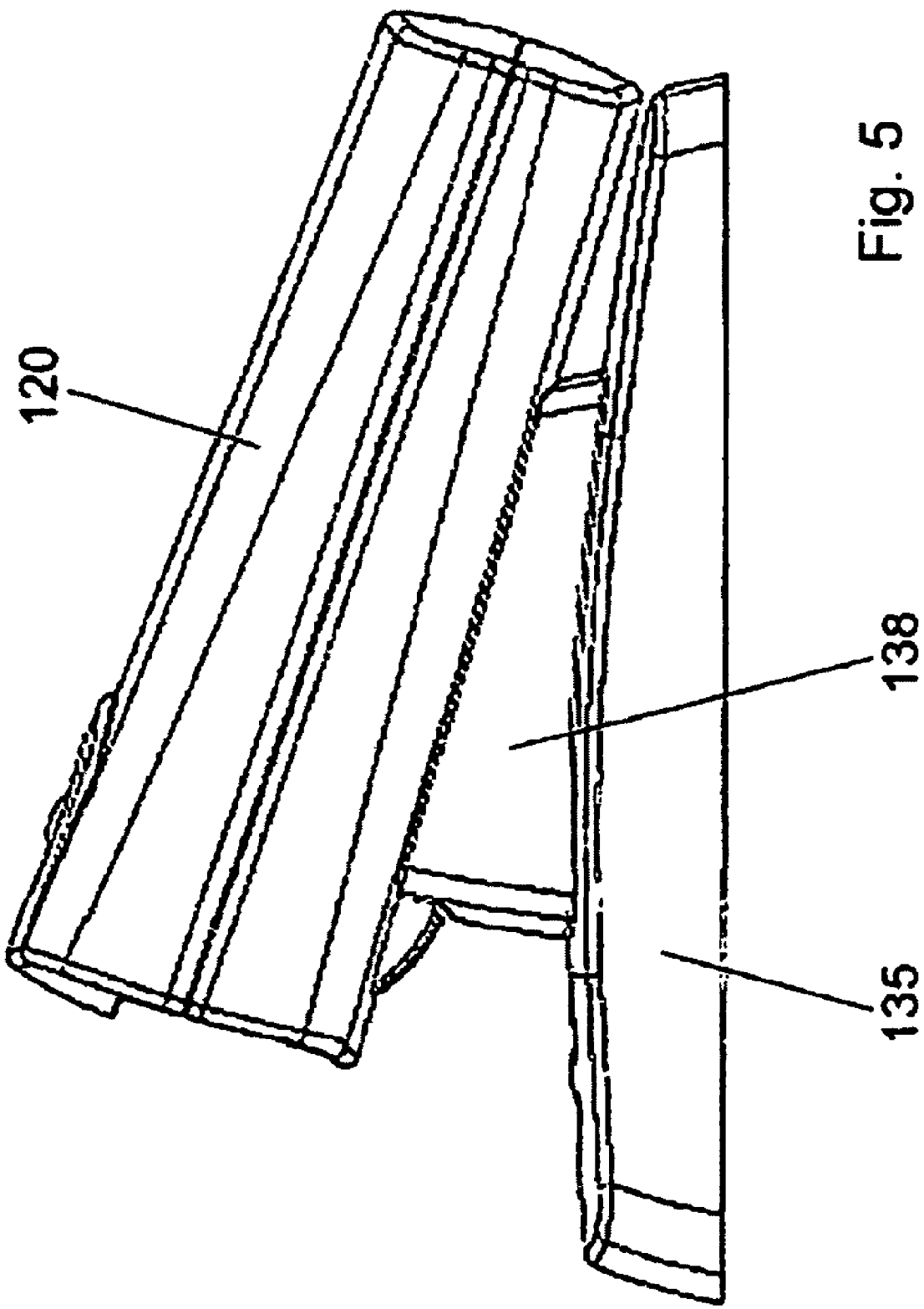

CONTAINER SYSTEM

CROSS-REFERENCE TO RELATED APPLICATIONS

This application is a continuation of U.S. patent application Ser. No. 11/502,652 that was filed Aug. 11, 2006, the disclosure of which is incorporated by reference in its entirety. U.S. patent application Ser. No. 11/502,652 is a continuation-in-part of U.S. patent application Ser. No. 11/297,896 that was filed Dec. 8, 2005, and that issued Mar. 4, 2008 as U.S. Pat. No. 7,338,158, which is herein incorporated by reference in its entirety.

BACKGROUND

Reading eyeglasses are commonly used among people over the age of 30. Many people who use reading eyeglasses only use them when reading. As such, reading eyeglasses are easily misplaced.

SUMMARY

A system comprising a container, a linking segment, and a container stand is provided. The container is configured to hold an object and includes an attachment device. The linking segment is configured for attachment to both the object and to the container. The container stand is configured to detachably receive the container using the attachment device.

BRIEF DESCRIPTION OF THE DRAWINGS

FIG. 5 shows a side perspective view of an eyeglasses container and a container segment stand.

DETAILED DESCRIPTION

The following discussion relates to an eyeglasses device comprising eyeglasses connected to a containing segment. FIGS. 1-5 illustrates preferred embodiments of the device of the present invention. The present invention is not limited to these particular embodiments.

The eyeglasses devices of the present invention are applicable for use in any setting where eyeglasses are prone to be lost (e.g., a bedroom, an office, an automobile, etc.). The eyeglasses device permits the containment of eyeglasses to a particular location, thereby preventing the accidental loss of the eyeglasses. The eyeglasses devices of the present invention provide numerous advantages over regular eyeglasses including, but not limited to, a misplacement-proof design. The present invention is not limited to a particular mechanism. Indeed, an understanding of the mechanism is not necessary to practice the present invention. Nevertheless, it is contemplated that the eyeglasses devices of the present invention function on the principle that upon securing the eyeglasses container to a location (e.g., a table), the eyeglasses cannot be misplaced due to the attachment between the eyeglasses and the eyeglasses container (described in more detail below).

Figure 1:
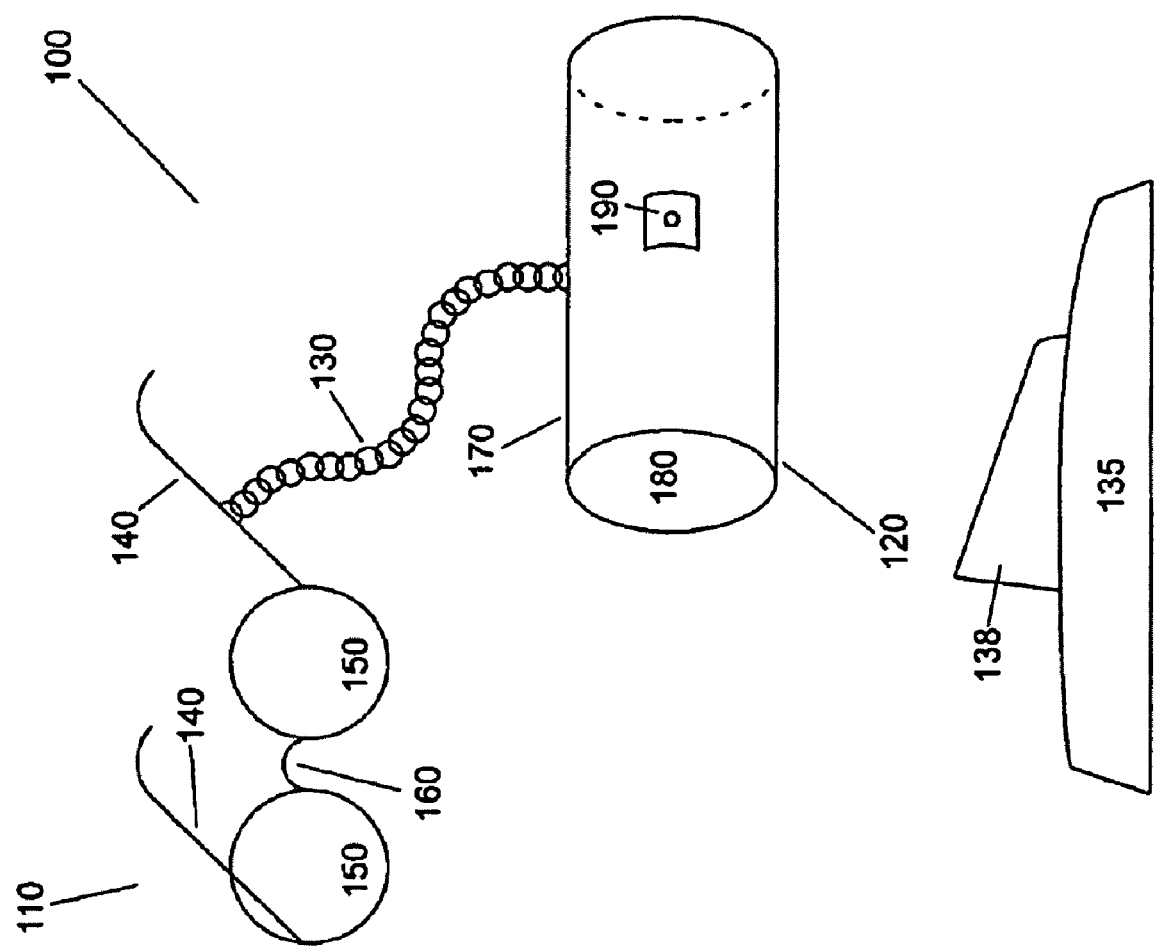
FIG. 1 shows an eyeglasses device embodiment.

FIG. 1 shows an eyeglasses device embodiment of the present invention. In some embodiments, the eyeglasses device 100 generally comprises an eyeglasses segment 110, an eyeglasses container 120, a linking segment 130, and a container segment stand 135. The eyeglasses device 100 is not limited to a particular size. In preferred embodiments, the size of the eyeglasses device 100 is such that it is able to fit within a small area (e.g., briefcase, a drawer, a pocket). In preferred embodiments, the eyeglasses device 100 is configured for simultaneous use by a user (e.g., a person requiring eyeglasses) and attachment to a location (e.g., a table) (described in more detail below).

Still referring to FIG. 1, the eyeglasses device 100 is not limited to a particular type of eyeglasses segment 110. In some embodiments, the eyeglasses segment 110 is a spectacle. In other embodiments, the eyeglasses segment 110 is reading glasses. In other embodiments, the eyeglasses segment 110 is sunglasses. In other embodiments, the eyeglasses segment 100 is prescriptive or non-prescriptive eyeglasses. The eyeglasses segment 110 is not limited to particular size dimensions. In preferred embodiments, the size of the eyeglasses segment 110 is such that it is able to fit within the eyeglasses container 120 (described in more detail below).

In preferred embodiments, as shown in FIG. 1, the eyeglasses segment 110 comprises eyeglasses arms 140, eyeglasses lenses 150, and an eyeglasses bridge 160. The eyeglasses segment 110 is not limited to a particular type or size of eyeglasses arms 140. The eyeglasses arms 140 are not limited to a particular shape. In preferred embodiments, the eyeglasses arms 140 are configured to fit over a user's ears. In preferred embodiments, the eyeglasses arms 140 are configured to fold such that the eyeglasses segment 110 is able to fit within the eyeglasses container 120 (described in more detail below).

Still referring to FIG. 1, the eyeglasses segment 110 is not limited to a particular type or size of eyeglasses lenses 150. In some embodiments, the eyeglasses lenses 150 are prescriptive lenses. In other embodiments, the eyeglasses lenses 150 are non-prescriptive. In other embodiments, the eyeglasses lenses 150 are sunglass lenses. The eyeglasses bridge 160 is not limited to a particular type or size.

Still referring to FIG. 1, the eyeglasses segment 110 is not limited to a particular type of eyeglasses bridge 160. In preferred embodiments, the eyeglasses bridge 160 is positioned between the eyeglasses lenses 150 such that it connects the eyeglasses lenses 150.

Still referring to FIG. 1, the eyeglasses device 100 is not limited to a particular type of eyeglasses container 120. The eyeglasses container 120 is not limited to a particular material composition (e.g., wood, plastic, metal, or mixture thereof). In preferred embodiments, the material composition of the eyeglasses container 120 is plastic. In preferred embodiments, the eyeglasses container 120 comprises an eyeglasses container body 170. In preferred embodiments, the eyeglasses container body 170 is a hollowed cylindrical container. In other embodiments, the eyeglasses container body 170 is a hollowed rectangular container. The eyeglasses container body 170 is not limited to particular size dimensions. In preferred embodiments, the size of the eyeglasses container body 170 is such that it is able to fit the eyeglasses segment 110. In preferred embodiments, the eyeglasses container body 170 has therein an eyeglasses container body opening 180. The eyeglasses container body opening 180 is not limited to particular size dimensions. In preferred embodiments, the eyeglasses container body opening 180 is sized such that the eyeglasses segment 110 are able to fit within the eyeglasses container body opening 180. In some embodiments, the eyeglasses container 120 has thereon a clothing attachment clip (e.g., a belt clip) for securing the eyeglasses container 120 onto a user's clothing (e.g., user's belt). The eyeglasses container 120 is not limited to a particular type or size of clothing attachment clip. In some embodiments, the eyeglasses container 120 has thereon a retracting mechanism (e.g., retractable coil mechanism) for engaging and retrieving the linking segment 130 (described in more detail below). The eyeglasses container 120 is not limited to a particular type or size of retracting mechanism.

Still referring to FIG. 1, the eyeglasses container 120 has thereon an eyeglasses container attachment agent 190. The eyeglasses container 120 is not limited to particular eyeglasses container attachment agent 190. In preferred embodiments, the eyeglasses container attachment agent 190 is Velcro. In other preferred embodiments, the eyeglasses container attachment agent 190 is double sided tape. In some embodiments, the eyeglasses container attachment agent 190 is configured to engage the container segment stand 135 (e.g., snap lock, slip lock, suction cup). The eyeglasses container attachment agent 190 is not limited to a particular size or shape. The eyeglasses container attachment agent 190 is not limited to a particular position location on the eyeglasses container 120. In preferred embodiments, the eyeglasses container attachment agent 190 is positioned on the exterior of the eyeglasses container 120. In preferred embodiments, the eyeglasses container attachment agent 190 is attached to a location (e.g., table) such that the eyeglasses container 120 is secured to the location (e.g., a table, the container segment stand 135).

Still referring to FIG. 1, the eyeglasses device 100 is not limited to a particular linking segment 130 (e.g., chain, wire, string, tape, cord, etc.). In preferred embodiments, the linking segment 130 is a chain. The linking segment 130 is not limited to a particular length (e.g., 1 inch, 5 inches, 10 inches, 20 inches, etc.). In preferred embodiments, the length of the linking segment 130 is 18 inches. In preferred embodiments, the length of the linking segment 130 is such that a user is able to comfortably use the eyeglasses segment 110 while the eyeglasses container 120 is secured to a location.

Still referring to FIG. 1, the linking segment 130 connects with the eyeglasses segment 110 and the eyeglasses container 120. The linking segment 130 is not limited to a particular connection location with the eyeglasses segment 110. In preferred embodiments, the linking segment 110 connects with the eyeglasses segment 110 at an eyeglasses segment arm 140. The linking segment 130 is not limited to a particular connection location with the eyeglasses container 120. In preferred embodiments, the linking segment 130 connects with the eyeglasses container 120 along the exterior of the eyeglasses container 120. The linking segment 130 is not limited to a particular method of attachment (e.g., glue, snap, soddering). In preferred embodiments, the linking segment 130 is configured to attach and detach from the eyeglasses segment 110 and the eyeglasses container 120. The linking segment 130 is not limited to a particular manner of attaching and detaching from the eyeglasses segment 110 and the eyeglasses container 120 (e.g., velcro attachment/detachment, snap attachment/detachment, button attachment/detachment, retracting mechanism, etc.). In some embodiments, the eyeglasses container segment 120 has therein a user controlled retracting means (e.g., retracting mechanism) for recoiling the linking segment 130.

Still referring to FIG. 1, the eyeglasses device 100 is not limited to a particular container segment stand 135. The container segment stand 135 is not limited to a particular material composition (e.g., wood, plastic, metal, or mixture thereof). The container segment stand 135 is not limited to particular size dimensions. In preferred embodiments, the size dimensions of the container segment stand 135 are designed to receive and secure the eyeglasses container 120. The container segment stand 135 is not limited to a particular manner of receiving and securing the eyeglasses container 120. In some embodiments, the eyeglasses container 120 snaps onto the container segment stand 135. In some embodiments, the eyeglasses container 120 attaches onto the container segment stand 135 via Velcro, double sided tape, or suction. In some embodiments, the container segment stand 135 has docking section 138 for purposes of receiving and securing the eyeglasses container 120. The docking section 138 is not limited to a particular size configuration, positioning within the container segment stand 135, or means for receiving and securing the eyeglasses container 120. In some embodiments, the docking section 138 is centrally positioned within the container segment stand 135 such that it is at an elevated position.

Still referring to FIG. 1, the container segment stand 135 is designed to attach onto a surface (e.g., table surface, wall, floor, carpet, etc.). The container segment stand 135 is not limited to a particular method of attaching onto a surface (e.g., double sided tape, Velcro, snap lock, etc.). In some embodiments, the container segment stand 135 is designed to provide accommodate additional accessories. For example, in some embodiments, in addition to receiving the eyeglasses container 120, the container segment stand 135 has therein a receiving dock for receiving any kind of a user's electronic device (e.g., cell phone, I-Pod, mp3 player, Blackberry, GPS device, palm pilot, etc.). The container segment stand 135 is not limited to a particular size or kind of receiving dock. In some embodiments, the receiving dock is configured to accept and secure multiple electronic devices. In some embodiments, the receiving dock is configured to receive electricity for purposes of recharging a received electronic device. The container segment stand 135 is not limited to a particular type, size or kind of recharging means. In some embodiments, in addition to receiving the eyeglasses container 120, the container segment stand 135 is designed to accept and secure office supplies. The container segment stand 135 is not limited to receiving and securing a particular number of or type of office supplies (e.g., stapler, writing utensil(s) holder, tape dispenser, note flags, stamp dispenser, etc.).

Figure 2:
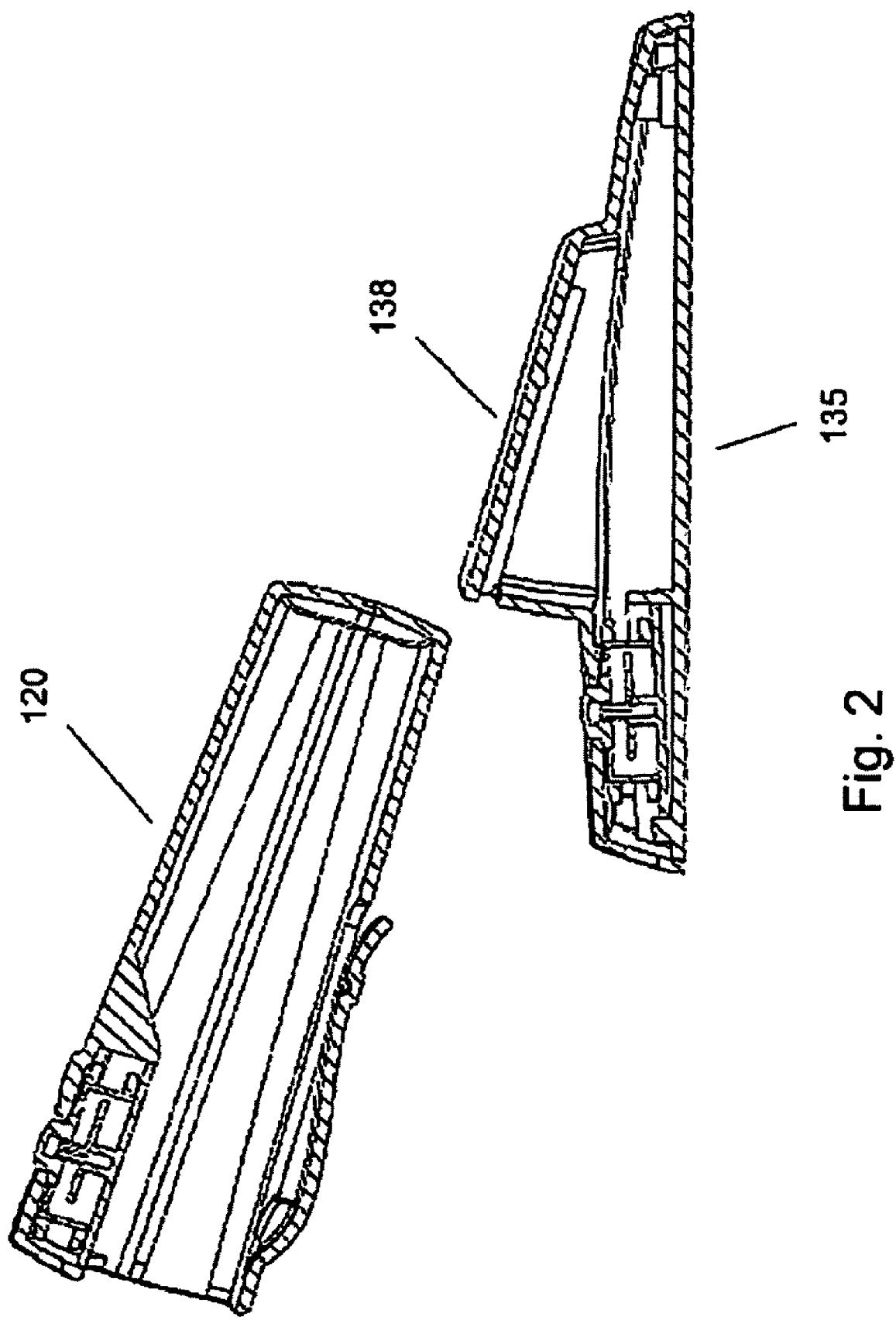
FIG. 2 shows a side perspective view of an eyeglasses container and a container segment stand.

FIG. 2 shows side perspective views of an eyeglasses container 120 and a container segment stand 135. As can be seen, the eyeglasses container 120 is configured to receive and secure eyeglasses. The container segment stand 135 is configured with a flat base for purposes of positioning on a level surface. The container segment stand 135 further has a centrally located docking section 138 configured to receive and secure the eyeglasses container 120.

Figure 3:
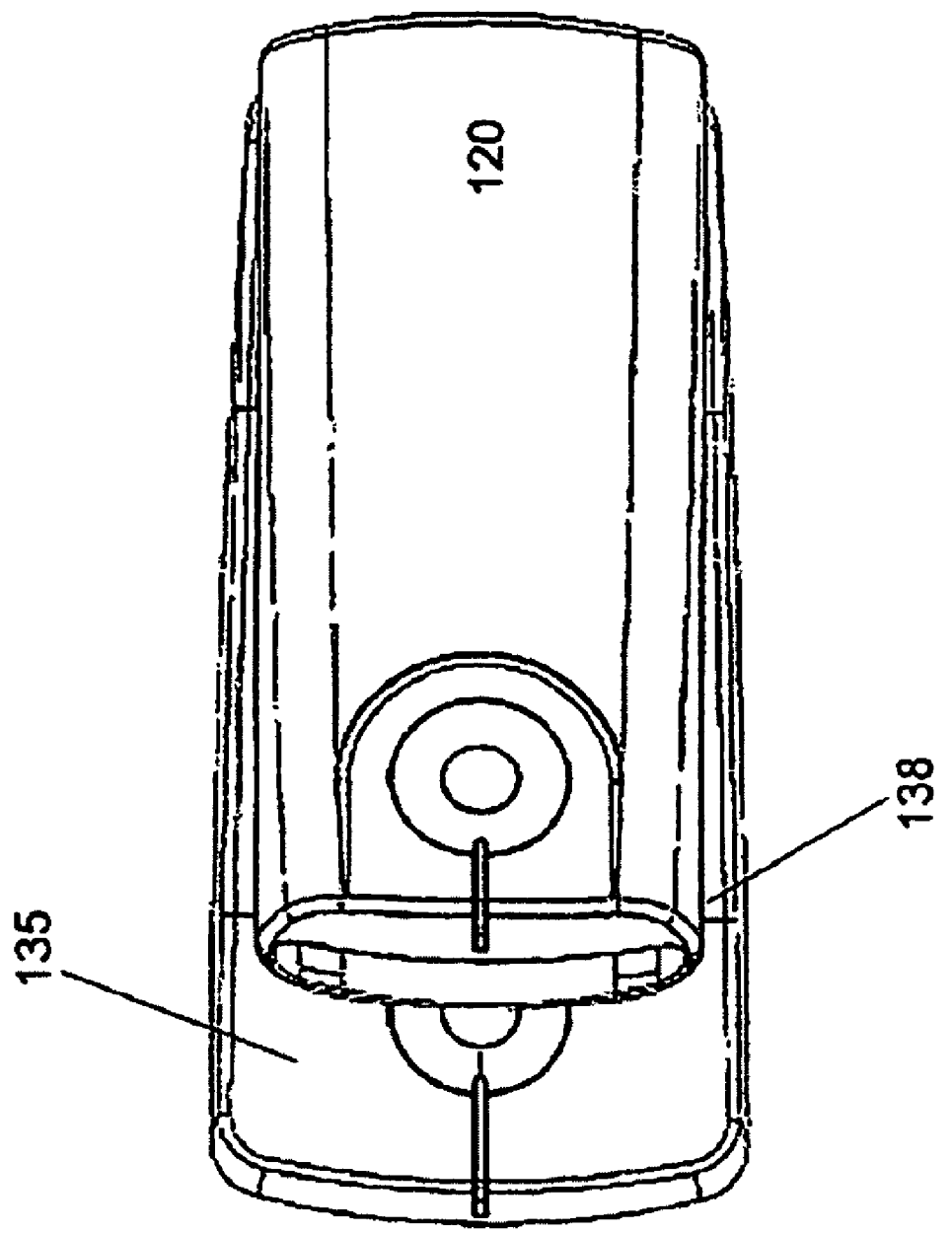
FIG. 3 shows an overhead perspective view of an eyeglasses container and a container segment stand.
Figure 4:
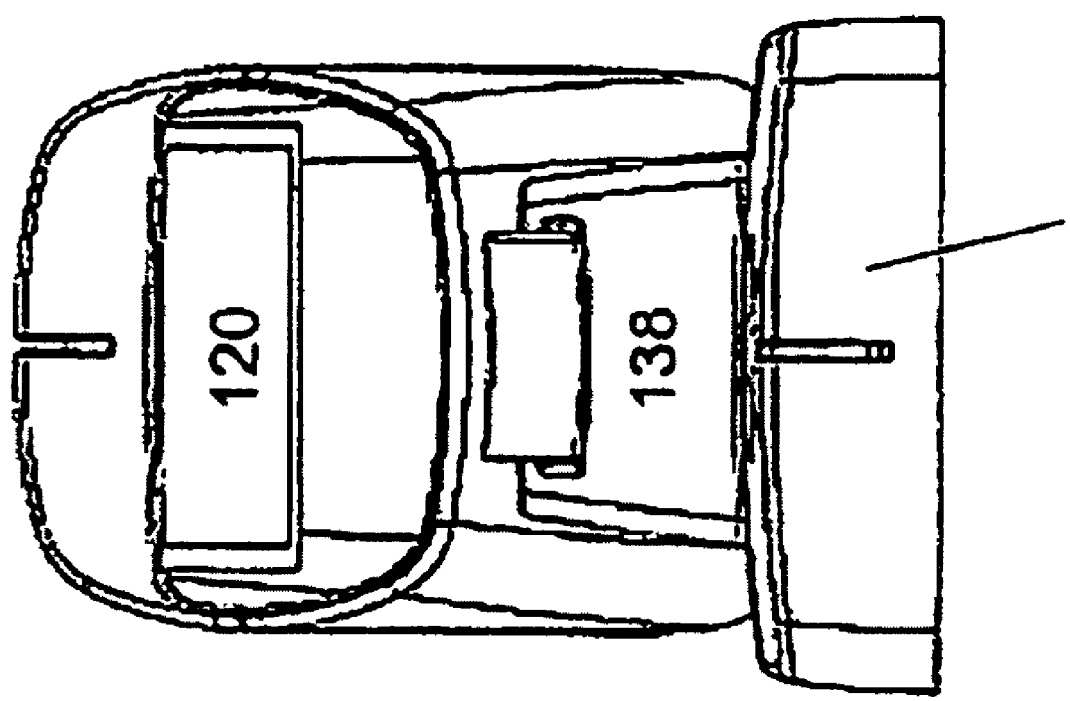
FIG. 4 shows a front perspective view of an eyeglasses container and a container segment stand.

FIG. 3 shows an overhead perspective of an eyeglasses container 120 secured (e.g., attached) with a container segment stand 135. FIG. 4 shows a front perspective of an eyeglasses container 120 secured (e.g., attached) with a container segment stand 135. FIG. 5 shows a side perspective of an eyeglasses container 120 secured (e.g., attached) with a container segment stand 135. As is shown in FIGS. 3-5, the eyeglasses container 110 is secured on the container segment stand 135 via the docking section 138. The eyeglasses container 110 is secured in a detachable manner with the container segment stand 135 such that a user may easily detach the eyeglasses container 110 or reattach the eyeglasses container 110. The eyeglasses container 120 is configured to receive and secure eyeglasses. The container segment stand 135 is configured with a flat base for purposes of positioning on a level surface.

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

What is claimed is:

1. A system comprising:
 a container configured to hold an object, wherein the object is a hand-held electronic device, and further wherein the container comprises an attachment device;
 a linking segment configured for attachment to both the object and to the container, wherein the linking segment is selected from the group consisting of a chain, a string, and a wire; and
 and a container stand configured to detachably receive the container using the attachment device.

2. The system of claim 1, wherein the hand-held electronic device is selected from the group consisting of a cell phone, a global positioning system device, a palm pilot type device, a Blackberry type device, an I-Pod type device, and an MP3 player.

3. The system of claim 1, wherein the container comprises an enclosure sized and shaped to hold the object.

4. The system of claim 1, wherein the attachment device is selected from the group consisting of a snap button, a suction device, double-sided tape, and Velcro.

5. The system of claim 1, wherein the linking segment is detachable from the object.

6. The system of claim 1, wherein the linking segment is detachable from the container.

7. The system of claim 1, wherein the container further comprises a retracting mechanism for retracting the linking segment.

8. The system of claim 1, wherein the container stand comprises a receiving dock for the object.

9. The system of claim 8, wherein the receiving dock is configured to re-charge the object.

10. The system of claim 1, wherein the container is configured to at least partially enclose the object.

11. The system of claim 1, wherein the container stand comprises a flat base for positioning on a level surface.

12. The system of claim 1, wherein the container further comprises a belt clip.

\* \* \* \* \*